J. P. E. BERNIER & F. A. ANDERSEN.
CAR BRAKE.
APPLICATION FILED SEPT. 10, 1912.
1,097,515.
Patented May 19, 1914.
2 SHEETS—SHEET 1.
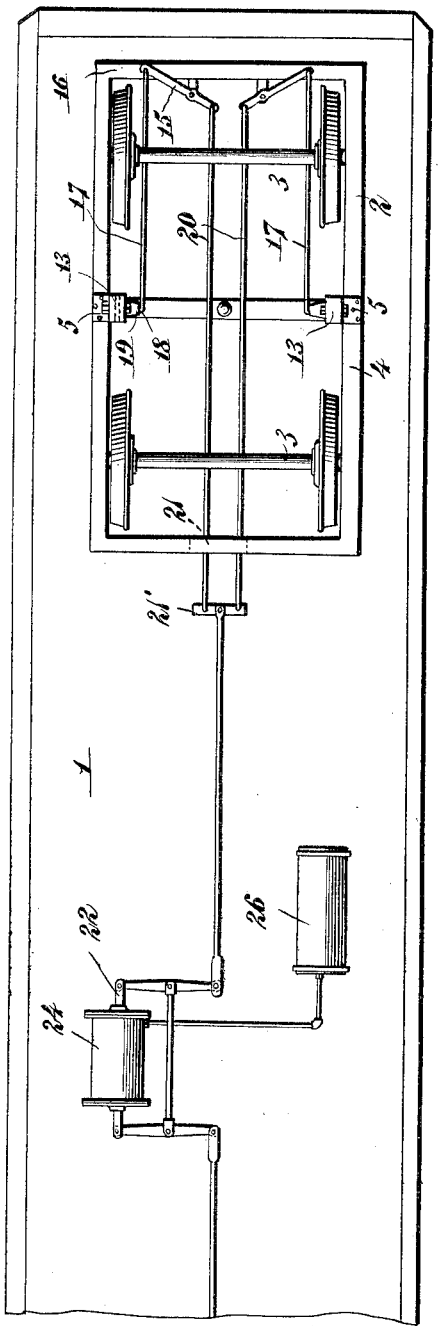
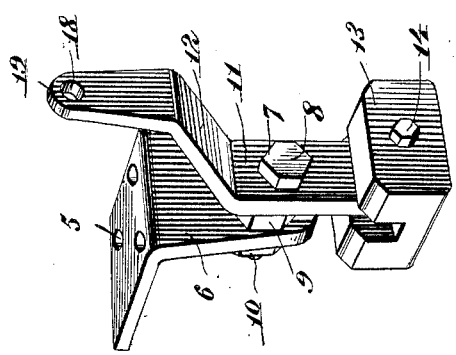
Witnesses
W. J. McDowell
James Koehl
Inventors
J. P. E. Bernier
Frank A. Andersen
By Victor J. Evans
Attorney

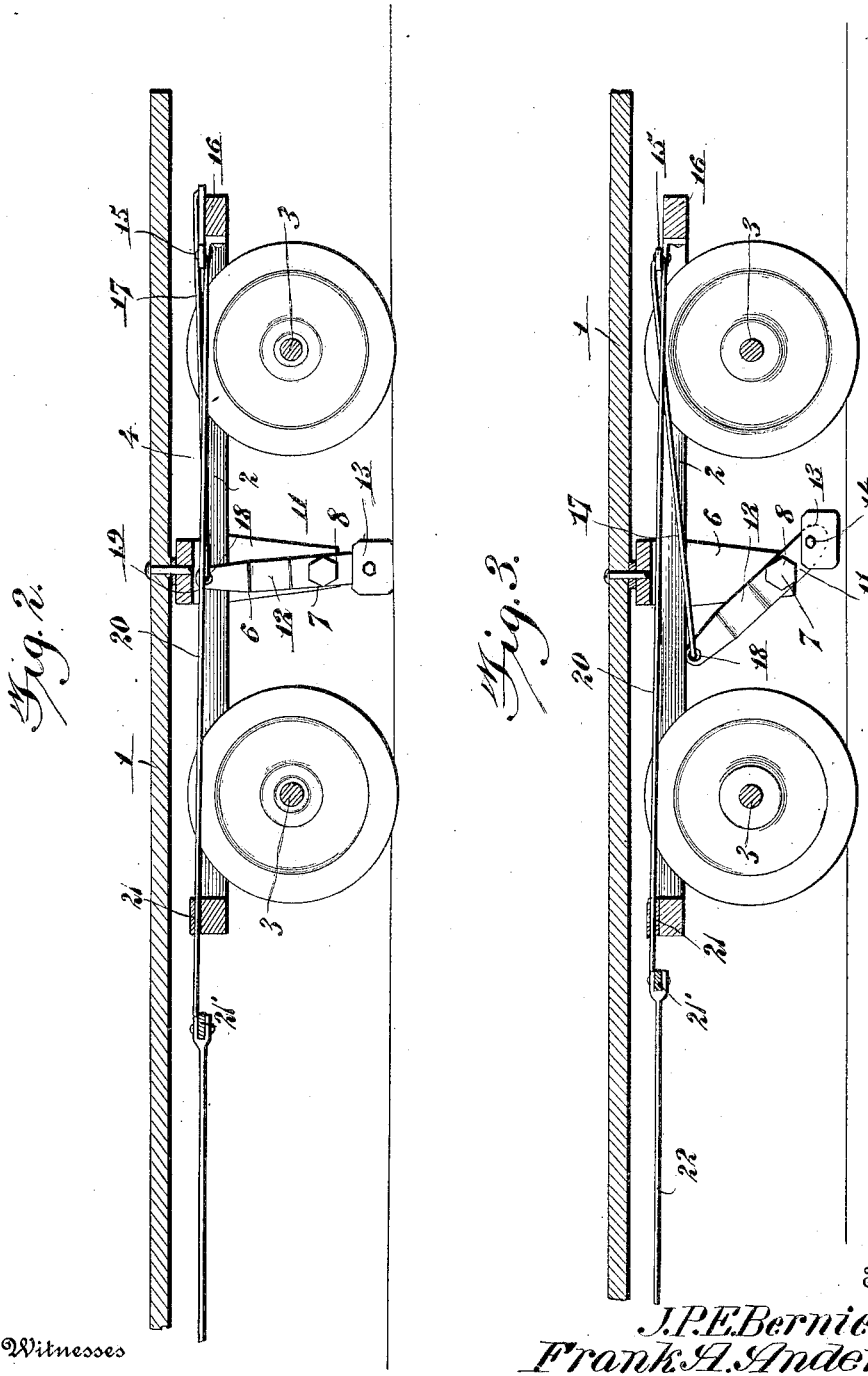

UNITED STATES PATENT OFFICE.

JAMES P. E. BERNIER, OF SALEM, AND FRANK A. ANDERSEN, OF DANVERS, MASSACHUSETTS.

CAR-BRAKE.

1,097,515.

Specification of Letters Patent.

Patented May 19, 1914.

Application filed September 10, 1912. Serial No. 719,614.

*To all whom it may concern:*

Be it known that we, JAMES P. E. BERNIER and FRANK A. ANDERSEN, citizens of the United States, residing at Salem and Danvers, respectively, in the county of Essex and State of Massachusetts, have invented new and useful Improvements in Car-Brakes, of which the following is a specification.

An object of the invention is to provide a car brake which is simple in construction and designed to brake the rails instead of the wheels whereby the full weight of the car may be utilized as a force to increase the maximum application of the shoes.

In the drawing forming a portion of this application and in which like letters of reference indicate similar parts in the several views:—Figure 1 is a bottom plan view of a portion of a car showing one of the trucks thereof equipped with the brake. Fig. 2 is a longitudinal section through the car showing the brake applied. Fig. 3 is a similar view showing the brake released. Fig. 4 is a perspective view of the shoe, the controlling lever therefor and the sustaining bracket.

The car 1 conventionally shown herein is provided with a truck 2 having a pair of wheeled axles, the longitudinal frame bars 4 of the truck having brackets 5 thereon whose depending portions 6 are disposed between the adjacent wheels of the companion axles 3. These depending portions of the brackets are provided with bolts 7 having heads 8 and companion jam nuts 9 and 10. These jam nuts impinge against the opposite surfaces of the depending portion 6 of each bracket while the head 8 and the adjacent nut 10 are spaced relatively for the reception therebetween of the shoe carrying branch 11 of a rocking lever 12 through which the bolt 7 is extended as shown. The lower ends of the branches 11 of the rocking levers have shoes 13 pivoted thereto through the medium of bolts 14 or other suitable equivalent detachable fastenings which are so designed that they can be readily disconnected from the levers to permit one to readily replace worn shoes by new ones when desired.

The actuating mechanism for the companion rocking arms 12 includes rocking levers 15 upon the bar 16 of the truck. These last named levers have their other ends connected to the other extremities of links 17, the inner ends of the links having connection at 18 with the portions 19 of the rocking levers 12. The rocking levers 15 have their inner ends connected to the outer ends of controlling rods 20. These rods are slidable in suitable guides 21 on the car truck and they are connected together by an equalizing member 21' having a piston rod 22 whose piston is designed to reciprocate in a cylinder 24. As conventionally shown the cylinder 24 may be connected to any suitable source of fluid supply such as a reservoir 26 beneath the car. A suitable valve (not shown) may be employed to admit a working fluid to effect adjustment of the shoes against the tracks or the removal of the same therefrom.

The construction described herein is such that the shoes 13 may be applied directly to the supporting rails, maximizing the braking efficiency of the device and entirely eliminating flattening of the supporting wheels of the car through friction of the shoes therewith. When the levers 12 are rocked to apply the shoes 13 to the rails the car will be lifted slightly from the rails so that the full weight of the car is applied to the shoes which lends admirably to a rapid application of the brake. While only one brake is shown it is to be understood that both the front and rear trucks of the car will be equipped with identical brakes. It is to be further understood that the device may be connected with any suitable part of the car structure as may be deemed advisable in maximizing the braking efficiency of the device. It is also stated that the device may be used upon portable carriers of any well known design.

We claim:

In a railway car brake, a pair of inverted

L-shaped brackets secured to the under and opposite sides of the truck of the car and depending therefrom between the wheels of the car, angular-shaped rocking levers centrally pivoted to said brackets in spaced relation thereto and having a portion disposed above the sides of said trucks, pivoted shoes on the lower end of said levers for engagement with the rails, second rocking levers pivoted on the rear end of said truck, links connecting the first-mentioned levers with one end of said second levers, and a fluid actuated equalizing member slidable beneath the said car and connected with the opposite ends of said second mentioned levers, for the purpose described.

In testimony whereof we affix our signatures in presence of two witnesses.

JAMES P. E. BERNIER.
FRANK A. ANDERSEN.

Witnesses:
N. H. BERNIER,
J. E. PANETAL,
BJARNE IVERSEN,
EDWIN F. McKENNEY.